US012700632B2

(12) United States Patent
Kim

(10) Patent No.: US 12,700,632 B2
(45) Date of Patent: Aug. 4, 2026

(54) POUCH FILM FOR SECONDARY BATTERY AND MANUFACTURING METHOD THEREOF

(71) Applicant: LG Energy Solution, Ltd., Seoul (KR)

(72) Inventor: Yong Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 608 days.

(21) Appl. No.: 18/033,628

(22) PCT Filed: Nov. 19, 2021

(86) PCT No.: PCT/KR2021/017108
§ 371 (c)(1),
(2) Date: Apr. 25, 2023

(87) PCT Pub. No.: WO2022/114687
PCT Pub. Date: Jun. 2, 2022

(65) Prior Publication Data
US 2023/0402686 A1 Dec. 14, 2023

(30) Foreign Application Priority Data

Nov. 25, 2020 (KR) ........................ 10-2020-0160452

(51) Int. Cl.
*H01M 50/129* (2021.01)
*H01M 50/105* (2021.01)
(Continued)

(52) U.S. Cl.
CPC ....... *H01M 50/129* (2021.01); *H01M 50/105* (2021.01); *H01M 50/119* (2021.01); *H01M 50/121* (2021.01); *H01M 50/136* (2021.01)

(58) Field of Classification Search
CPC ............. H01M 50/129; H01M 50/121; H01M 50/136; H01M 50/105; H01M 50/119
See application file for complete search history.

(56) References Cited

U.S. PATENT DOCUMENTS

| | | | |
|---|---|---|---|
| 2004/0187444 A1 | 9/2004 | Hutchinson et al. |
| 2006/0093905 A1 | 5/2006 | Kim |
| | (Continued) | | |

FOREIGN PATENT DOCUMENTS

| | | | |
|---|---|---|---|
| CN | 104040752 A | 9/2014 |
| CN | 104364929 A | 2/2015 |
| | (Continued) | | |

OTHER PUBLICATIONS

Extended European Search Report including Search Opinion from 21898513.3, dated Sep. 16, 2024, pp. 1-9.
(Continued)

*Primary Examiner* — Jane J Rhee
(74) *Attorney, Agent, or Firm* — Lerner David LLP

(57) ABSTRACT

A pouch film for a secondary battery and a method for manufacturing the same. In some embodiments, the pouch film includes a stretchable auxiliary layer that is a multi-layered structure comprising a plurality of layers, wherein layers in the plurality of layers have different elongation rates. The stress at the interface of each layer is relieved and the moldability of a pouch is improved. The risk of breakage of a pouch is significantly reduced and defect rates are reduced in a pouch manufacturing process, thereby reducing manufacturing costs.

6 Claims, 2 Drawing Sheets

(51) Int. Cl.
    *H01M 50/119*     (2021.01)
    *H01M 50/121*     (2021.01)
    *H01M 50/136*     (2021.01)

(56)         References Cited

U.S. PATENT DOCUMENTS

| | | | |
|---|---|---|---|
| 2008/0241663 A1* | 10/2008 | Yamashita | H01M 50/581 |
| | | | 429/122 |
| 2014/0356655 A1 | 12/2014 | Yoshino | |
| 2014/0377636 A1 | 12/2014 | Sung | |
| 2015/0050549 A1 | 2/2015 | Taniguchi | |
| 2015/0155531 A1* | 6/2015 | Takahagi | H01M 50/129 |
| | | | 429/163 |
| 2016/0211490 A1 | 7/2016 | Hashimoto et al. | |
| 2017/0025647 A1 | 1/2017 | Taniguchi | |
| 2017/0125749 A1 | 5/2017 | Takahagi et al. | |
| 2017/0149026 A1 | 5/2017 | Yang et al. | |
| 2018/0164550 A1 | 6/2018 | Wang | |
| 2020/0194737 A1 | 6/2020 | Yasuda et al. | |
| 2021/0083233 A1 | 3/2021 | Kim et al. | |
| 2021/0291493 A1 | 9/2021 | Kim et al. | |
| 2021/0376417 A1 | 12/2021 | Yoshino | |

FOREIGN PATENT DOCUMENTS

| | | | |
|---|---|---|---|
| CN | 208069037 U | 11/2018 | |
| JP | 3567230 B2 | 9/2004 | |
| JP | 2006512258 A | 4/2006 | |
| JP | 4410173 B2 | 2/2010 | |
| JP | 2011138793 A | 7/2011 | |
| JP | 2012203983 A | 10/2012 | |
| JP | 2013101765 A | 5/2013 | |
| JP | 5447742 B1 | 3/2014 | |
| JP | 2015008119 A | 1/2015 | |
| JP | 2015107585 A | 6/2015 | |
| JP | 2018097329 A | 6/2018 | |
| JP | 2018187819 A † | 11/2018 | |
| JP | 2019119177 A | 7/2019 | |
| JP | 2021190419 A | 12/2021 | |
| KR | 20140084462 A | 7/2014 | |
| KR | 101442854 B1 | 9/2014 | |
| KR | 20160058834 A | 5/2016 | |
| KR | 20170059683 A | 5/2017 | |
| KR | 20170142624 A | 12/2017 | |
| KR | 20180019430 A | 2/2018 | |
| KR | 20180023699 A | 3/2018 | |
| KR | 20190134613 A | 12/2019 | |
| KR | 20200008955 A | 1/2020 | |
| KR | 20200025101 A | 3/2020 | |
| KR | 20200071208 A | 6/2020 | |
| WO | 2013183511 A1 | 12/2013 | |

OTHER PUBLICATIONS

Third Party Observation for JP2023-518522 submitted Aug. 13, 2024, pp. 1-2.
International Search Report for PCT/KR2021/017108 mailed Mar. 3, 2022. 3 pages.

\* cited by examiner
† cited by third party

PET adhesive layer nylon

Al-Foil

POUCH FILM FOR SECONDARY BATTERY AND MANUFACTURING METHOD THEREOF

CROSS-REFERENCE TO RELATED APPLICATIONS

This application is a national phase entry under 35 U.S.C. § 371 of International Application No. PCT/KR2021/017108, filed on Nov. 19, 2021, which claims the benefit of Korean Patent Application No. 10-2020-0160452, filed on Nov. 25, 2020, the disclosures of which are incorporated by reference herein.

TECHNICAL FIELD

The present disclosure relates to a pouch film for a secondary battery and a method for manufacturing the pouch film, wherein the pouch film includes a stretchable auxiliary layer having a multi-layered structure having a plurality of layers, wherein layers in the plurality have different elongation rates, so that stress at the interface of each layer is relieved and the moldability of a pouch is improved during pouch molding, and the risk of breakage of a pouch is significantly reduced and defect rates are reduced in a pouch manufacturing process, thereby reducing manufacturing costs.

BACKGROUND ART

A secondary battery capable of being subject to repeated charging and discharging may be classified into a cylindrical secondary battery, a prismatic secondary battery, a pouch-type secondary battery, and the like according to the structure or manufacturing method thereof. Although a cylindrical battery or a prismatic battery typically using a metal can as an exterior material for a secondary battery has been mainly used, a battery of such a structure has a fixed shape, and thus, is disadvantageous in that the design of an electronic product using the battery as a power source is restricted, and has a difficulty of reducing the volume thereof. Accordingly, the development of a pouch-type secondary battery is actively underway.

A pouch-type secondary battery generally has a structure in which an electrode assembly having a structure in which an electrode and a separator are alternately disposed in a sheet-type pouch case is received, and specifically, the pouch-type secondary battery is largely divided into a lower portion in which a receiving part is formed and an upper portion covering the lower part, and the electrode assembly embedded in the receiving part is formed by laminating a positive electrode, a negative electrode, and a separator. In addition, an electrode tab is drawn out from each electrode, and a tape is attached to a portion of the electrode tab overlapping a sealing portion.

Unlike a cylindrical battery, there are advantages in that a pouch-type secondary battery of the above structure may be relatively easily deformed in shape, and may implement a secondary battery having the same capacity with a smaller volume and mass, but there is a problem in that the pouch-type secondary battery is weak in mechanical strength since a soft pouch is used as a container.

A pouch is manufactured to have a receiving part by drawing-molding a pouch film with a punch and the like, during which process stretching inevitably occurs, and when excessive stretching occurs, the pouch is exposed to a risk of having fine cracks or breakage. In the case of cracks or breakage in the pouch which serves as an exterior material, an electrolyte solution is leaked or reacts with oxygen, so that there is a problem in that the performance of a battery is degraded and the safety thereof cannot be ensured.

Taking, for example, an aluminum (AL) pouch, a polymer is laminated on both sides of an aluminum foil as illustrated in FIG. 1, and in general, polypropylene (PP) is laminated on the innermost layer, and nylon and polyethylene terephthalate. (PET) are laminated on the outermost layer in order. Here, a nylon layer is for improving the moldability of a pouch, and has a ductility which is about halfway between the ductility of polyethylene terephthalate and the ductility of aluminum, so that the nylon layer is laminated therebetween to serve to relieve stress, thereby preventing upper and lower layers from being easily broken.

However, nylon has a high unit cost, and is easily delaminated when a heat sealing process is performed in a packaging step. Therefore, there is a need for an alternative material or structure which may further reduce cost while providing a layer capable of supplementing the moldability of a pouch, such as a nylon layer.

DISCLOSURE OF THE INVENTION

Technical Problem

An aspect of the present disclosure provides a pouch film for a secondary battery and a method for manufacturing the pouch film, wherein the pouch film includes a stretchable auxiliary layer having a multi-layered structure having a plurality of layers, wherein layers in the plurality have different elongation rates, so that stress at the interface of each layer is relieved and the moldability of a pouch is improved during pouch molding, and the risk of breakage of a pouch is significantly reduced and defect rates are reduced in a pouch manufacturing process, thereby reducing manufacturing costs.

Technical Solution

According to an aspect of the present disclosure, there are provided a pouch film for a secondary battery and a method for manufacturing the pouch film, wherein the pouch film for a secondary battery is for manufacturing a pouch-type battery case and includes a sealant layer formed as the innermost layer, a surface protection layer formed as the outermost layer, a gas barrier layer laminated between the sealant layer and the surface protection layer, and a stretchable auxiliary layer laminated between the gas barrier layer and the surface protection layer, wherein the stretchable auxiliary layer has a multi-layered structure having a plurality of layers, where layers in the plurality have different elongation rates.

The stretchable auxiliary layer may have a greater elongation rate toward the surface protection layer.

In the stretchable auxiliary layer, each of the plurality of layers may have an elongation rate of 20% to 130%.

The stretchable auxiliary layer may comprise a first modification PET layer, and a second modification PET layer bonded to an upper portion of the first modification PET layer, wherein the second modification PET layer may have a greater elongation rate than the first modification PET layer.

The stretchable auxiliary layer may further include a third modification PET layer bonded to an upper portion of the second modification PET layer, wherein the third modification PET layer may have a greater elongation rate than the second modification PET layer.

The first modification PET layer may have an elongation rate of 45% to 55%, the second modification PET layer may have an elongation rate of 65% to 75%, and the third modification PET layer may have an elongation rate of 85% to 95%.

The method for manufacturing a pouch film for a secondary battery of the present disclosure includes laminating a gas barrier layer on an upper portion of a sealant layer, laminating the stretchable auxiliary layer on an upper portion of the gas barrier layer, and laminating a protection layer on an upper portion of the stretchable auxiliary layer.

The laminating of a stretchable auxiliary layer may be performed by laminating a stretchable auxiliary layer formed to have a greater elongation rate toward the surface protection layer.

The laminating of a stretchable auxiliary layer may be laminating a stretchable auxiliary layer in which each of a plurality of layers each has an elongation rate of 20% to 130%.

The laminating of a stretchable auxiliary layer may be laminating a stretchable auxiliary layer in which a second modification PET layer is bonded to an upper portion of a first modification PET layer, and a third modification PET layer is bonded to an upper portion of the second modification PET layer, wherein the third modification PET layer has a greater elongation rate than the second modification PET layer, and the second modification PET layer has a greater elongation rate than the first modification PET layer.

Advantageous Effects

In a pouch film for a secondary battery and a method for manufacturing the pouch film according to the present disclosure, the pouch film for a secondary battery is for manufacturing a pouch-type battery case and includes a sealant layer formed as the innermost layer, a surface protection layer formed as the outermost layer, a gas barrier layer laminated between the sealant layer and the surface protection layer, and a stretchable auxiliary layer laminated between the gas barrier layer and the surface protection layer, wherein the stretchable auxiliary layer having a multi-layered structure having a plurality of layers, wherein layers in the plurality have different elongation rates, so that stress at the interface of each layer may be relieved and the moldability of a pouch may be improved during pouch molding, and the risk of breakage of a pouch may be significantly reduced and defect rates may be reduced in a pouch manufacturing process, thereby reducing manufacturing costs.

BRIEF DESCRIPTION OF THE DRAWINGS

FIG. 1 is a cross-sectional view illustrating a typical pouch film for a secondary battery.

MODE FOR CARRYING OUT THE INVENTION

Figure 2:
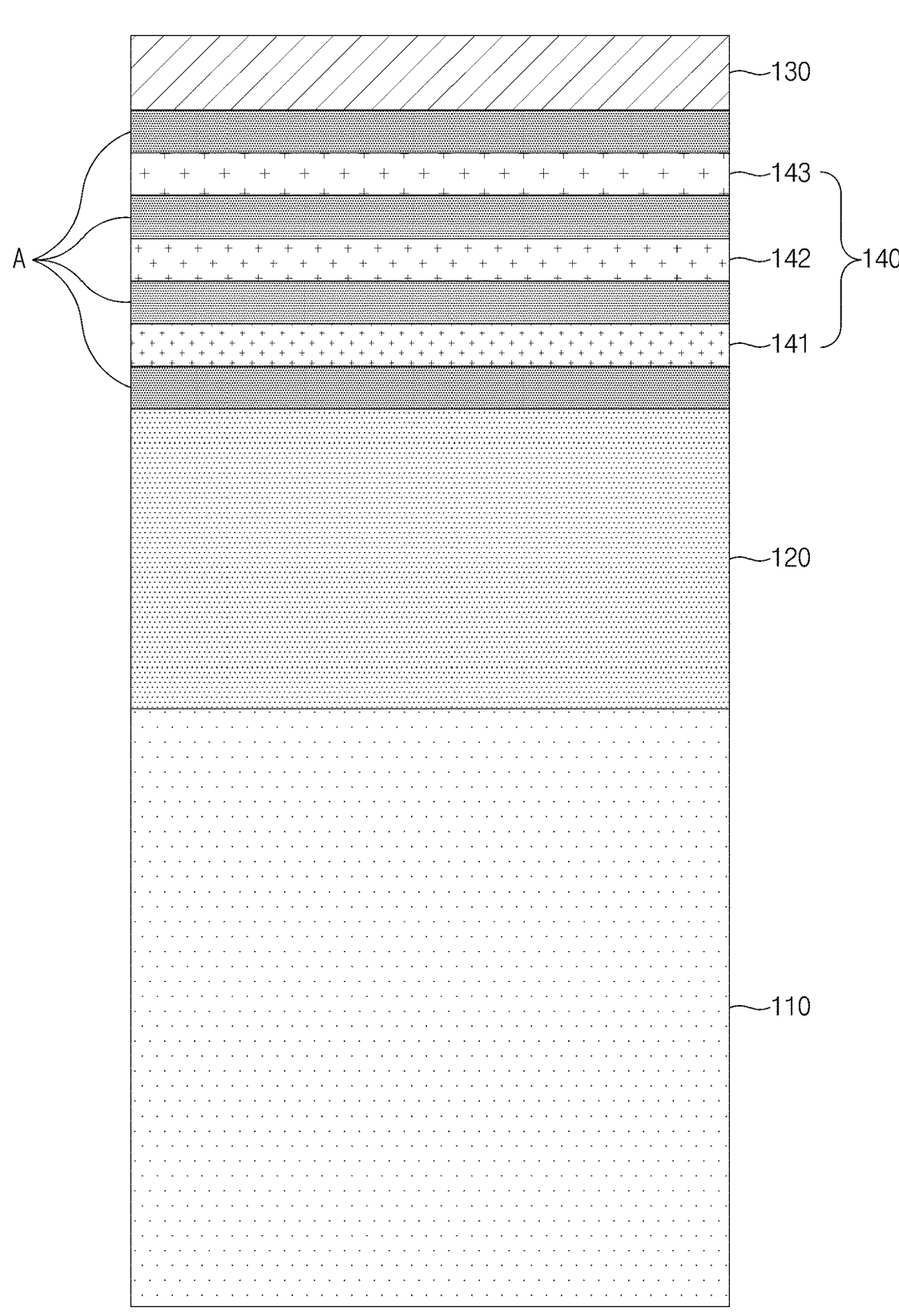
FIG. 2 is a cross-sectional view illustrating a pouch film for a secondary battery according to Example 1 of the present disclosure.

Hereinafter, preferred embodiments of the present disclosure will be described in detail with reference to the accompanying drawings so that those skilled in the art to which the present disclosure pertains may easily practice the embodiments. However, the present disclosure may be embodied in many different forms, and is not limited or restricted to the embodiments set forth herein.

In order to clearly explain the present disclosure, parts irrelevant to the description or detailed descriptions of related known technologies that may unnecessarily obscure the gist of the present disclosure have been omitted, and in the present specification, in adding reference numerals to elements of each drawing herein, the same or similar reference numerals shall be assigned to the same or similar elements throughout the specification.

In addition, it will be understood that words or terms used in the specification and claims of the present disclosure shall not be construed as being limited to having the meaning defined in commonly used dictionaries. It will be further understood that the words or terms should be interpreted as having meanings that are consistent with their meanings in the context and the technical idea of the disclosure, based on the principle that an inventor may properly define the meaning of the words or terms to best explain the disclosure.

Example 1

Figure 1:
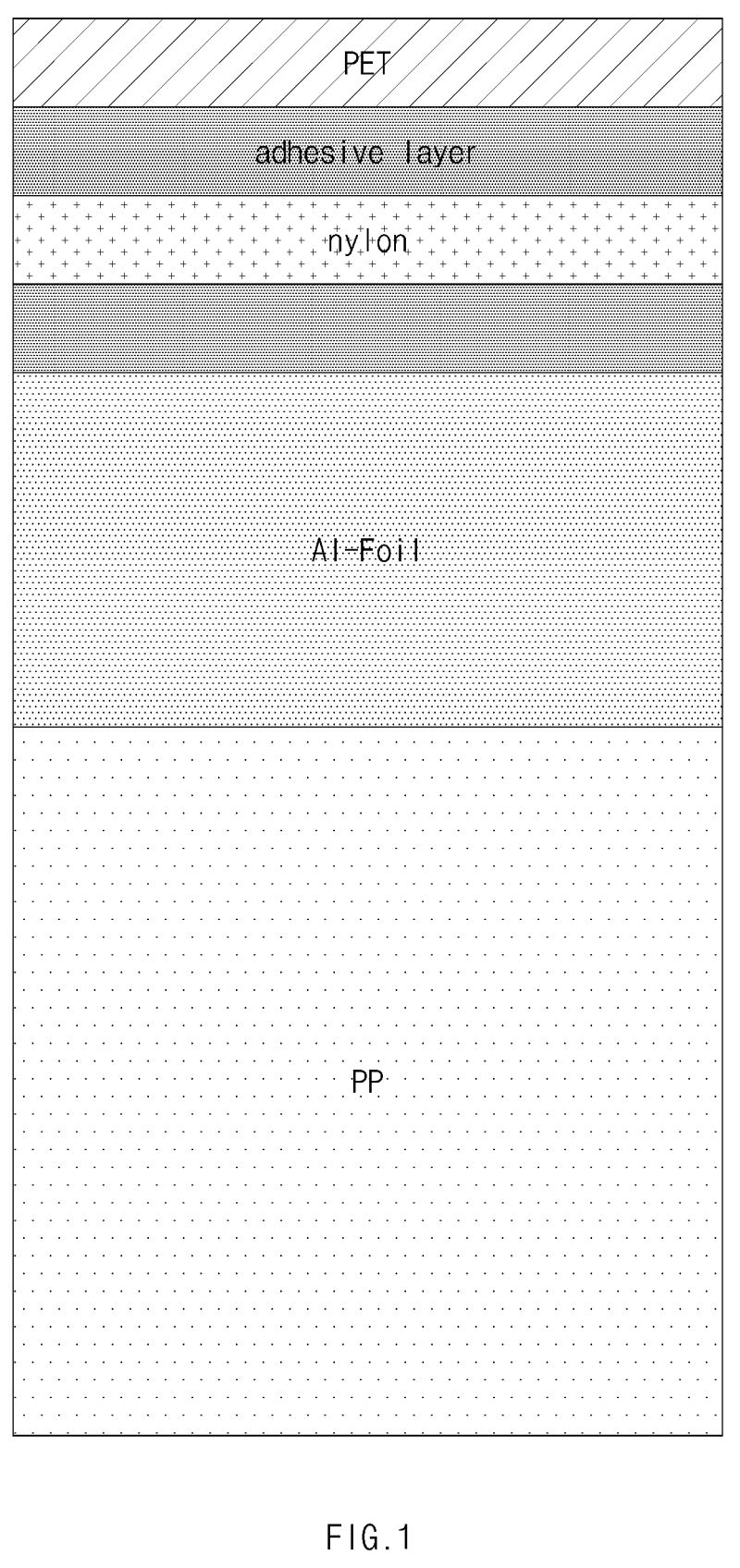

FIG. 1 is a cross-sectional view illustrating a typical pouch film for a secondary battery. FIG. 2 is a cross-sectional view illustrating a pouch film for a secondary battery according to Example 1 of the present disclosure.

Referring to FIG. 2, a pouch film 100 for a secondary battery according to Example 1 of the present disclosure includes a sealant layer 110, a surface protection layer 130, a gas barrier layer 120, and a stretchable auxiliary layer 140.

The sealant layer 110 is formed as the innermost layer of the pouch film 100, thereby directly contacting an electrode assembly, and is a layer serving as a sealing material with chemical resistance and thermal adhesion with respect to an electrolyte solution, and is usually formed of a polypropylene (PP)-based resin, and preferably, may be formed of polypropylene (PP).

The surface protection layer 130 is a layer formed as the outermost layer of the pouch film 100, and serves to protect a battery from external impacts, and since the surface protection layer 130 is in direct contact with hardware, the surface protection layer 130 is required to have insulation and heat resistance. The surface protection layer 130 may include, as a material thereof, a single layer of one or a composite layer of two or more selected from polyethylene (PE), polypropylene (PP), polyethylene terephthalate (PET), low-density polyethylene (LDPE), high-density polyethylene (HDPE), and preferably, may be formed of polyethylene terephthalate.

The gas barrier layer 120 is a layer laminated between the sealant layer 110 and the surface protection layer 130, and corresponds to a layer which maintains the mechanical strength of the pouch film 100 and serves as a barrier against moisture and oxygen. The gas barrier layer 120 may be formed of an alloy of iron (Fe), carbon (C), chromium (Cr), and manganese (Mn), an alloy of iron (Fe), carbon (C), chromium (Cr), and nickel (Ni), and preferably, may be formed of aluminum (Al). Aluminum may secure mechanical strength of a predetermined level or above while being light in weight, and may secure chemical resistance and heat dissipation with respect to an electrode assembly and an electrolyte solution.

The stretchable auxiliary layer 140 is laminated between the gas barrier layer 120 and the surface protection layer 130, and has a ductility which is about halfway between the ductility of the gas barrier layer 120 and the ductility of the surface protection layer 130. By providing the stretchable auxiliary layer 140 such as the above, when the pouch film 100 is stretched during a molding process of the pouch film 100, the stretching of the pouch film 100 is assisted so as not to be easily broken.

The stretchable auxiliary layer 140 according to Example 1 of the present disclosure is formed by bonding a plurality of layers having different elongation rates. That is, since the stretchable auxiliary layer 140 is formed by bonding a plurality of layers having different elongation rates, not formed as a single layer, elongation may be variously configured according to the laminated position of the pouch film 100, and stress may be relieved at the interlayer interface between the gas barrier layer 120 and the surface protection layer 130 to improve the moldability of the pouch film 100.

The pouch film 100 is inevitably stretched in the process of molding a receiving part of a pouch and in the process of using a pouch-type secondary battery, which is a finished product. In this case, stretching occurs in a form in which pressure is applied from the inside of the pouch film 100 toward the outside thereof. Therefore, it is common for the pouch film 100 to have a structure in which a layer having a greater elongation rate is laminated from the innermost layer toward the outermost layer.

In order to correspond to the above, the pouch film 100 for a secondary battery according to Example 1 of the present disclosure may be formed such that the elongation rate of a plurality of layers constituting the stretchable auxiliary layer 140 increases toward the surface protection layer 130, through which the elongation rate of the entire pouch film 100 is allowed to increase from the innermost layer toward the outermost layer of the pouch film 100 to have high moldability. The pouch film 100 having such high moldability has a low risk of having cracks or breakage not only during a molding process but also after the molding, which leads to a decrease in pouch defect rate, resulting in a reduction in manufacturing costs.

Each of the plurality of layers may be formed of a modification PET layer having an elongation rate of 20% to 30%. Here, a modification PET layer refers to PET whose elongation rate is modified by subjecting the PET to a physical and chemical change. Since PET is cheaper than nylon, which is mainly utilized as the stretchable auxiliary layer 140, typically, when PET is used as a substitute for nylon by modifying the elongation rate of the PET, it is possible to reduce the cost of the pouch film 100.

To describe the stretchable auxiliary layer 140 composed of a modification PET layer in detail, the stretchable auxiliary layer 140 may be composed of a first modification PET layer 141 and a second modification PET layer 142 bonded to an upper portion of the first modification PET layer 141. At this time, the second modification PET layer 142 may be formed to have a greater elongation rate than the first modification PET layer 141.

In addition, the stretchable auxiliary layer 140 may further includes a third modification PET layer 143 bonded to an upper portion of the second modification PET layer 142, and the third modification PET layer 143 may be formed to have a greater elongation rate than the second modification PET layer 142. Between modification PET layers, an adhesive layer A may be formed to bond between the modification PET layers, and the adhesive layer A may be also formed between the stretchable auxiliary layer 140 and the gas barrier layer 120 and between the stretchable auxiliary layer 140 and the surface protection layer 130 to bond between the layers.

When the stretchable auxiliary layer 140 is formed of a modification PET layer as described above, PET may be variously applied by varying the degree of modification thereof depending on the use of a pouch, and a good-quality pouch with a low risk of breakage may be manufactured by varying the number of layers in which a modification PET layer is applied. In addition, when compared with nylon typically used as the stretchable auxiliary layer 140, delamination occurs relatively less at high temperatures, so that heat sealing may be performed at high temperatures, and as a result, there is an effect of improving processing efficiency.

As described above, each of the plurality of layers forming the stretchable auxiliary layer 140 may have an elongation rate of 20% to 130%, and for example, the first modification PET layer 141 may have an elongation rate of 45% to 55%, the second modification PET layer 142 may have an elongation rate of 65% to 75%, and the third modification PET layer 143 may have an elongation rate of 85% to 95%. The moldability of the entire pouch film 100 may be uniformly secured by allowing each modification PET layer to have an elongation rate of 20% to 130% as described above, while configuring an elongation rate to increase from the first modification PET layer 141 adjacent to the gas barrier layer 120 toward the third modification PET layer 143 adjacent to the surface protection layer 130 with a difference in elongation of a predetermined size or more between the modification PET layers.

Example 2

FIG. 2 is a cross-sectional view illustrating a pouch film for a secondary battery according to Example 1 of the present disclosure. Example 2 of the present disclosure is different from Example 1 in that Example 2 is the disclosure about a method for manufacturing the pouch film of Example 1.

The contents common to Example 1 will be mostly omitted and Example 2 will be described with a focus on the differences. That is, it is apparent that the contents that are not described in Example 2 may be referred to the contents of Example 1.

Referring to FIG. 2, the method for manufacturing a pouch film for a secondary battery according to Example 2 of the present disclosure includes laminating the gas barrier layer 120, laminating the stretchable auxiliary layer 140, and laminating the surface protection layer 130.

First, the gas barrier layer 120 is laminated on an upper portion of a sealant layer, and then on an upper portion of the gas barrier layer 120, the stretchable auxiliary layer 140 formed by bonding a plurality of layers having different elongation rates is laminated. At this time, each of the plurality of layers of the stretchable auxiliary layer 140 may have an elongation rate of 20% to 130%, and the stretchable auxiliary layer 140 may be bonded to the upper portion of the gas barrier layer 120 by allowing the elongation rate to increase as getting closer to the surface protection layer 130.

To describe the laminating of the stretchable auxiliary layer 140 in detail, the second modification PET layer 142 may be bonded to an upper portion of the first modification PET layer 141, and the third modification PET layer 143 may be bonded to an upper portion of the second modification PET layer 142. At this time, the stretchable auxiliary layer 140 in which the third modification PET layer 143 is formed to have a greater elongation rate than the second modification PET layer 142, and the second modification PET layer 142 is formed to have a greater elongation rate than the first modification PET layer 141 may be laminated.

When the pouch film 100 is manufactured by including the stretchable auxiliary layer 140 of a multi-layered structure in which a plurality of layers having different elongation rates are bonded, stress at the interface of each layer is relieved and the moldability of a pouch is improved during pouch molding, and the risk of breakage of a pouch is significantly reduced and defect rates are reduced in a pouch manufacturing process, thereby reducing manufacturing costs.

Although the present disclosure has been described with reference to the preferred embodiments and the drawings, it is to be understood that the disclosure is not limited thereto, and it is to be understood by those skilled in the art that various changes in form and details may be made therein without departing from the spirit and scope of the disclosure as defined by the following claims.

DESCRIPTION OF THE SYMBOLS

100: pouch film
110: The sealant layer
120: gas barrier layer
130: surface protection layer
140: stretchable auxiliary layer
141: first modification PET layer
142: second modification PET layer
143: third modification PET layer
A: adhesive layer

The invention claimed is:

1. A pouch film for a secondary battery for manufacturing a pouch-type battery case, the pouch film comprising:
   a sealant layer formed as the innermost layer;
   a surface protection layer formed as the outermost layer;
   a gas barrier layer laminated between the sealant layer and the surface protection layer; and
   a stretchable auxiliary layer laminated between the gas barrier layer and the surface protection layer,
   wherein the stretchable auxiliary layer is a multi-layered structure comprising a plurality of layers, and
   wherein the plurality of layers includes:

a first modification PET layer having an elongation rate of 45% to 55%,
   a second modification PET layer bonded to the first modification PET layer, the second modification PET layer having an elongation rate of 65-75%, and
   a third modification PET layer bonded to the second modification PET layer, the third modification PET layer having an elongation rate of 85% to 95%.

2. The pouch film of claim 1, wherein the stretchable auxiliary layer has a greater elongation rate toward the surface protection layer.

3. The pouch film of claim 1, wherein, in the stretchable auxiliary layer, each layer in the plurality of layers has an elongation rate of 20% to 130%.

4. A method for manufacturing a pouch film for a secondary battery, the method comprising:
   laminating a gas barrier layer on a sealant layer;
   laminating a stretchable auxiliary layer on the gas barrier layer, wherein the stretchable auxiliary layer is a multi-layered structure comprising a plurality of layers; and
   laminating a protection layer on the stretchable auxiliary layer, such that the sealant layer, gas barrier layer, stretchable auxiliary layer, and protection layer are sequentially arranged,
   wherein the plurality of layers includes:
      a first modification PET layer having an elongation rate of 45% to 55%,
      a second modification PET layer bonded to the first modification PET layer, the second modification PET layer having an elongation rate of 65-75%, and
      a third modification PET layer bonded to the second modification PET layer, the third modification PET layer having an elongation rate of 85% to 95%.

5. The method of claim 4, wherein the stretchable auxiliary layer has a greater elongation rate toward the surface protection layer.

6. The method of claim 4, wherein, in the stretchable auxiliary layer, each layer in the plurality of layers has an elongation rate of 20% to 130%.

* * * * *